W. WALTON.
Cultivator.
No. 78,626.  Patented June 2, 1868.
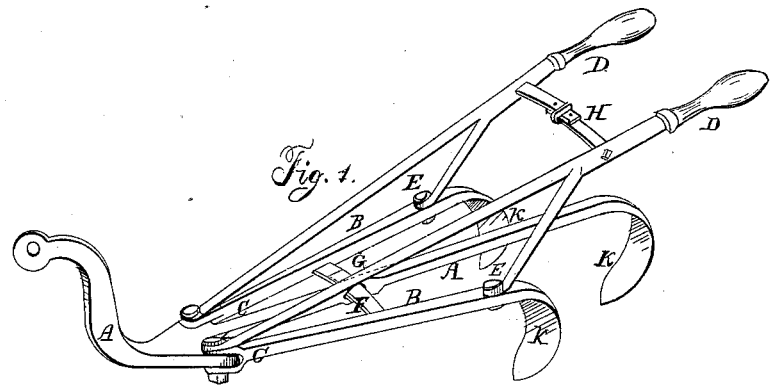
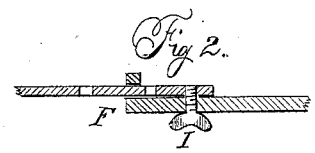
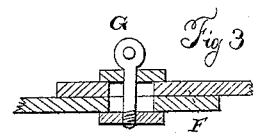
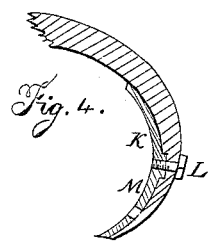
WITNESSES:
INVENTOR:

United States Patent Office.

WILLIAM WALTON, OF EAST PALESTINE, OHIO.

*Letters Patent No. 78,626, dated June 2, 1868.*

IMPROVEMENT IN CULTIVATORS.

*The Schedule referred to in these Letters Patent and making part of the same.*

TO ALL WHOM IT MAY CONCERN:

Be it known that I, WILLIAM WALTON, of East Palestine, in the county of Columbiana, and in the State of Ohio, have invented an Improved Cultivator; and do hereby declare that the following is a full, clear, and exact description thereof, reference being had to the accompanying drawings, making a part of this specification, in which—

Figure 1 is a perspective view.
Figure 2 is a longitudinal section of the bars for adjusting the handles.
Figure 3 is a longitudinal section of the bars for adjusting the wings.
Figure 4 is a section showing the manner of holding the hoes.

This invention consists in providing means for more readily adjusting the hoes to any desired width of furrow, in so connecting the handles to the frame as to avoid contact between them and the corn, and in fastening the hoes so that, while easily reversed, they are not liable to be displaced, as in case of those which are held by a bolt only.

In the annexed drawings, A represents the beam, the front end of which is bent upward, forming a gooseneck, to which the draw-bar is attached.

B B represent two wings, the front ends of which are attached to the beam A by clevis-joints C, which allow their rear ends to be moved transversely, for the purpose of adjusting the hoes to any desired width of furrow.

The handles D are fastened to the wings B by bolts passing through the joints C, and by braces bolted at E, so as to always occupy a position in line with and directly over the wings.

Attached to the inner side of the wings are curved bars F, the inner ends of which overlap each other and pass through a mortise in the beam A.

G represents a bolt passing downward through the beam A and bars F, and screwing into the lower half of the beam. The bars F are slotted lengthwise, where the bolt G passes through, to allow the wings to be adjusted, when the bolt is screwed down, springing the beam together, and firmly clamping the bars.

Similar curved bars, H, are attached to the inner side of the handles D, the end of one having formed upon it a square loop, through which the other passes, and are clamped together by a bolt, I, passing through one and screwing into the other, the whole serving to brace the handles and strengthen the cultivator. A number of holes are provided for the bolt, to allow for adjustment. The rear ends of the wings and beam are curved downwards, and the hoes K fastened to them. The hoes are double ended, so that they may be reversed, and are held in place by the bolt L, wart M, and corresponding hole in the hoe.

I am aware that cultivators have been constructed before with means for adjusting them to different widths of furrow, and also that double-end hoes have been used, and therefore do not claim these features, but consider that my device consists essentially in the arrangement of the bars and joints for adjusting the wings, the manner of applying the handles directly to the wings, so that they may always be in line with and directly over them, avoiding, thereby, interference with the corn, and also in the application of the wart upon the iron and corresponding hole in the hoe, by which means the latter is held more securely in place.

Having thus fully set forth the nature and merits of my improvement, what I claim as new, and desire to secure by Letters Patent, is—

Attaching the handles D directly to the wings B, and providing an adjustable brace in the curved bars H, in the manner and for the purpose substantially as herein set forth.

In testimony that I claim the foregoing, I have hereunto set my hand, this 24th day of March, 1868.

WILLIAM WALTON.

Witnesses:
LUTHER M. McCOWN,
J. T. CHAMBERLIN.